Jan. 12, 1932.                L. R. BIGGS                1,841,082
                          ELECTRICAL REGULATOR
                          Filed April 7, 1930
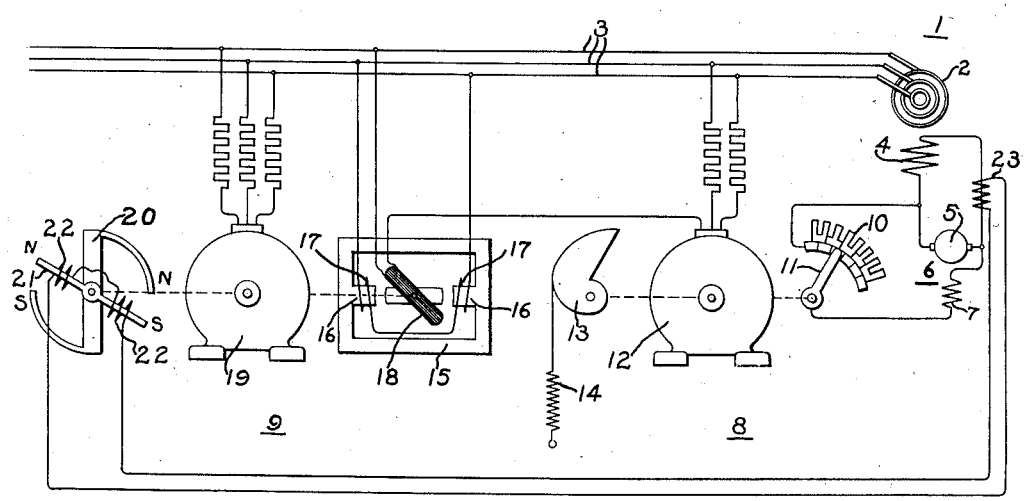
Inventor:
Leonard R. Biggs,
By Charles E. Mullen
   His Attorney.

Patented Jan. 12, 1932

1,841,082

UNITED STATES PATENT OFFICE

LEONARD R. BIGGS, OF SCOTIA, NEW YORK, ASSIGNOR TO GENERAL ELECTRIC COMPANY, A CORPORATION OF NEW YORK

ELECTRICAL REGULATOR

Application filed April 7, 1930. Serial No. 442,240.

My invention relates to electrical regulators and regulating systems, and more particularly to regulators for controlling an electrical condition of an electric circuit or dynamo-electric machine.

Regulators of an operating condition of electrical machinery fall generally within one or the other of the following two main classes, the vibratory contact type, as exemplified by the well-known Tirrill regulator, and the resistance type. Each of these regulators, however, depends for its operation upon some means which is operable in response to variations in the characteristic, condition, or quantity which is being regulated. With direct current and single phase systems, the design of this means offers no particular difficulty, as a simple solenoid arrangement will usually suffice. However, with polyphase systems, due to the fact that phase unbalance is important from the point of view of stability of synchronous machines, the design of a suitable condition responsive means becomes more complicated. One such means, which gives satisfactory operation is a polyphase torque motor which is connected to the polyphase circuit in such a way that its torque is responsive to unbalanced conditions, as well as to variations in the balanced condition being regulated.

The sensitivity of torque motor regulators, as well as other regulators, to small variations in the regulated condition is becoming increasingly important because as a result of the present tendency toward interconnection of systems and increase in the capacity of generating stations, very small changes in the regulated condition, for example line voltage, at the terminals of a given machine may be attended by large variations in its power factor and output.

In order to increase the sensitivity of any regulator, but particularly of resistance type regulators employing a polyphase torque motor, for in such regulators mechanical friction tending to reduce the sensitivity is usually highest, I provide novel means responsive to variations in the regulated condition for amplifying these changes as they are applied to the regulating means, which in the embodiment shown is a torque motor operated regulator.

It is an object of my invention to provide a new and improved electrical regulator.

It is another object of my invention to provide means for increasing the sensitivity of an electrical regulator.

It is an additional object of my invention to provide means for amplifying the changes in the regulated condition to which the main control means of an electrical regulator is responsive, and which has particular application to polyphase torque motor regulators of the resistance type.

It is a further object of my invention to provide novel combined restraining and antihunting means for an electrical regulator.

My invention will be better understood from the following description taken in connection with the accompanying drawing and its scope will be pointed out in the appended claims.

Referring now to the single figure of the accompanying drawing, which represents diagrammatically a preferred embodiment of my invention, 1 is a regulated polyphase synchronous machine having an armature 2 connected to a line 3 and a field winding 4 connected across the terminals of the armature 5 of a shunt exciter 6. Although machine 1 has been shown as a three-phase machine, it will be obvious as the description of my invention proceeds that it might equally well be a single phase machine, and it will also be obvious to those skilled in the art that while I have illustrated an embodiment of my invention for regulating the voltage of a dynamo-electric machine it may be applied equally well in regulating other electrical conditions, such as current, power, power factor, etc., without departing from the scope of my invention.

My regulator consists of two distinct parts, one part 8, which in the particular embodiment illustrated is essentially the same as an ordinary torque motor operated resistance regulator, while part 9 comprises the means for amplifying the variations in the electrical condition to which part 8 is responsive and which thereby increases the sensitivity of the regulator as a whole.

Part 8 comprises a variable resistance consisting of resistance 10 and movable arm 11 which are connected in series with field winding 7 of exciter 6. Arm 11 is connected to the shaft of a polyphase torque motor 12, whose terminals are connected across line 3. This motor is essentially a small polyphase induction motor, such as the motor shown in detail in United States Letters Patent 1,743,798, Robert H. Park, which is assigned to the same assignee as is this application. The means for opposing and balancing the torque of motor 12 comprises a cam 13 mounted on the shaft of motor 12 and a spring 14 connected thereto.

Part 9 consists in turn of three distinct elements, the first being an amplifying means which as shown is a variable ratio transformer comprising a core member 15 having two pole pieces 16 on which are wound coils 17 which are connected in series across one of the phases of line 3. This amplifying means also comprises a movable coil 18 which is connected in series with one of the supply conductors of motor 12. The second element of part 9 is a polyphase torque motor 19, whose terminals are connected across line 3. The third element of part 9 is a combined restraining and anti-hunting device comprising an S-shaped permanent magnet 20 and a movable armature 21 therefor which is mounted on the shaft of motor 19. Armature 21 carries a pair of coils 22, which are connected so as to be energized in accordance with the rate of change of current in field winding 4 and as shown are connected to the secondary winding of a current transformer 23 which is in circuit with field winding 4 of regulated machine 1.

The operation of the illustrated embodiment of my invention is as follows. It will be assumed for the sake of a detailed description of the operation that machine 1 is an alternator, although it will be obvious to those skilled in the art that it might be any synchronous machine. In fact, my regulator might equally well be applied to any kind of a regulator, having a movable regulating element, for line 3, in which case arm 11 might be considered to represent the movable element of such a regulator.

Considering first part 8 alone and assuming that alternator 1 and exciter 6 are both being operated by any suitable means at their proper rated speeds, the voltage on line 3 will produce a torque in motor 12 which it will be assumed is tending to turn its rotor in a clockwise direction so as to increase the amount of resistance in the field of exciter 6 and thereby reduce the voltage of the exciter and consequently the terminal voltage of machine 1 and the voltage of line 3 to which it is connected. Opposing this torque is the pull of spring 14, which is connected to cam 13. This cam is so designed that for the angular position of the rotor of motor 12 when normal voltage is applied to it the torque produced by spring 14 plotted as ordinates against angular position of the rotor of motor 12 as abscissæ will be substantially a horizontal line. In the position of cam 13 corresponding to the position of the rotor of motor 12 when no voltage is applied to its terminals the retarding torque of spring 14 will be comparatively high. Therefore, as voltage across the terminals of motor 12 increases the action will be as follows, the rotor of motor 12 will have a small angular displacement per volt increase upon motor 12 up to normal voltage, at which point similar voltage changes will produce large angular movements in motor 12, thus making the regulator sensitive to small departures from normal voltage. If then the line voltage should drop, due for example to an increase in load on machine 1, motor 12 will then tend to turn in a counter-clockwise direction thereby decreasing the resistance in the shunt field circuit of exciter 6 and increasing the terminal voltage of machine 1. Conversely, an increase in voltage on line 3 will cause motor 12 to turn in a clockwise direction thereby to decrease the voltage of alternator 1. Due, however, to the fact that spring 14 applies a force which is at right angles to the bearings of machine 12 and to the fact that arm 11 encounters some mechanical resistance in moving, there are appreciable frictional retarding forces tending to reduce the sensitivity of the operation of motor 12. For the purpose of increasing the sensitivity of part 8 and amplifying the variations in the electrical condition to which part 8 is responsive part 9 is employed.

Considering now the action of the amplifying element of part 9, it will readily be seen that when coil 18 is in a vertical plane as viewed in the drawing it will have a maximum voltage induced in it, while when it is in a horizontal plane there will be no voltage induced in it. As this coil is mounted to turn with the rotor of torque motor 19 it is so arranged that its angular movement due to an increase in voltage on line 1 tends to move it more nearly into a vertical plane to thereby increase its induced voltage and consequently to increase the voltage in one of the phase windings of torque motor 12. As the only friction in part 9 is bearing friction and as in actual practice the elements of part 9 are arranged vertically so that bearing friction will be reduced to a minimum it will be obvious that the movements of torque motor 19 can be made very sensitive to variations in the voltage of line 1.

However, in order that part 9 shall operate properly it is necessary that some kind of restraining means be applied to motor 19 so that variations in voltage on line 3 above or below normal will tend to make motor 19 move in a clockwise direction or in a counter-clockwise direction respectively, and also that as soon as the voltage returns to normal motor 19 should come to rest, for in order that any regulator should act properly it must have a considerable range of positions at which it is balanced for normal voltage. Means similar to cam 13 and spring 14 might be employed for this purpose. However, as the amplifying element comprising coils 17 and 18 itself produces a torque which aids that of motor 19, the shape of the cam would have to be different from that of cam 13.

Preferably I provide a magnetic restraining device in which there is no mechanical friction. Element 20 of this device being a permanent magnet, it tends to move armature 21 to a horizontal position, that is to say, it produces a counter-clockwise torque on the rotor of motor 19. This torque is made to exactly balance the torque of motor 19 plus the torque of the amplifying device. If now the voltage of circuit 3 rises the torque of motor 19 increases which will produce a clockwise motion of its rotor. As a result of this clockwise rotation the torque of the amplifying device decreases, but at the same time the restraining torque of the magnetic device also decreases as the armature 21 is moving away from the poles of magnet 20 and this device is so designed that for a given angular movement of the rotor of the motor 19, decreases or increases in the opposing torques of the amplifying device and the restraining device are exactly equal so that when the torque of motor 19 returns to normal as a result of the return of the voltage of circuit 3 to normal there will be no unbalanced forces tending to turn the motor shaft. Due to the pull characteristics of a magnet and its associated armature the force or torque necessary to break armature 21 away from magnet 20 when they are touching each other will be relatively high. Thus, these elements may be so designed that it requires nearly full voltage in order that the torque of motor 19 should be great enough to cause armature 21 to leave the poles of magnet 20 with the result that there is very slight angular movement of the shaft of motor 19 until approximately normal voltage is reached, at which voltage the parts are balanced over a considerable range of angular positions. It should be noted that although I have shown magnet 20 to be a permanent magnet it will at once occur to those skilled in the art that a saturated electromagnet or an electromagnet with constant energization might equally well be employed without departing from the spirit of my invention.

It will thus be seen that as part 8 acts in a manner to regulate the voltage of circuit 3 and that as part 9 acts to insert in the windings of motor 12 a voltage which increases or decreases in proportion to the changes in voltage on line 3 there will be produced an amplified change in voltage across the terminals of motor 12, as a result of the function of part 9, thereby to increase or decrease the torque of motor 12 as a result of given variations in the voltage of line 3. As part 9 has its friction reduced to a minimum it will be sensitive to very minute variations in the voltage of line 3.

Although for the sake of simplicity and clearness I have shown but a single amplifying device with its movable coil connected in but one of the phase windings of motor 12, it will, of course, be obvious to those skilled in the art that as many of these devices as there are phases might be mounted on the shaft of motor 19, each one having its movable coil connected in one of the phases of torque motor 12, without departing from my invention in its broader aspects.

Due to the sensitive balance between the elements of part 9 there may be a tendency for this part to overswing, or in other words, to produce hunting, for as the opposing torques of the amplifying element and the restraining element change simultaneously and in proportion there would ordinarily be nothing except friction to stop the rotation of motor 19 after the voltage decreases or increases to normal after a given variation. In order to check this tendency coils 22 are so connected that their energization varies in accordance with the rate of change of current through the field winding 4 of machine 1. Thus for example assume that part 9 tends to over-swing in a counter-clockwise direction. In this situation coil 18 will decrease the induced voltage inserted in the winding of motor 12, thereby decreasing its torque and causing it to turn in a counter-clockwise direction to continue to decrease the resistance in field winding 7 of exciter 6. As a result the excitation of machine 1 will increase, thereby increasing the voltage of line 3 above normal when the regulator will again act to counteract this tendency. However, as the current through field winding 4 increases, a voltage across the secondary winding of current transformer 23 will be produced, thereby increasing the magnetic flux in arm 21. Coils 22 are so wound that the flux produced by them in armature 21 is in the opposite direction to the flux through armature 21 resulting from the permanent magnet. Therefore, with motor 19 tending to over-swing in a counter-clockwise direction armature 21 will be approaching its horizontal position, but at the same time its effective permeability will be decreasing due to the increase in current through coils 22 as a result of the increase in current through field winding 4. The result of this decrease in effective permeability of armature 21 will be to decrease the torque of the restraining element which of course is in a direction tending to turn motor 19 in a counter-clockwise direction. Therefore, as the torque of this motor decreases the torque of the magnetic restraining means also decreases thereby producing, in effect, a damping action tending to retard the speed of rotation of the motor 19. As soon as the voltage of line 3 returns to normal the torque of motor 19 will become normal and as a result of the damping action it is moved relatively slowly and there will be a minimum tendency for it to over-swing. In a like manner, if motor 19 tends to turn in a clockwise direction to decrease the excitation of machine 1 in order to reduce the voltage on line 3 the decrease in current through field winding 4 will induce a voltage in the secondary winding of current transformer 23 in such a direction that the current flowing through coils 22 will produce a flux which is in the same direction as that produced by magnet 20. Therefore, the torque of the restraining element will be increased thereby to retard the motion of motor 19. As coils 22 are only energized when the current through field winding 4 is changing they will not tend to produce any alteration in the torque of the restraining element at a time when motor 19 is stationary. Thus the action of the anti-hunting means is somewhat similar to the action of the retarding mechanism comprising a rotating disk and drag magnets which is found in most watthour meters.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In an electrical regulator, in combination, means responsive to variations in an electrical condition to be regulated, means responsive to said means for varying said condition, additional means responsive to variations in said electrical condition, and means under the control of said last mentioned means for amplifying the variation of said condition by producing variable amounts of condition to which said first mentioned means is also responsive.

2. In an electrical regulator, in combination, electromagnetic means responsive to variations of an electrical condition to be regulated, means operable in accordance with the operation of said electromagnetic means for varying said electrical condition, additional electromagnetic means responsive to variations in said electrical condition, and means responsive to said additional electromagnetic means for producing variable amounts of said condition which are added to the variations of said electrical condition to which said first mentioned electromagnetic means is responsive.

3. In an electrical regulator, in combination, a dynamo-electric machine responsive to variations of an electrical condition to be regulated, means under the control of said dynamo-electric machine for altering the magnitude of said regulated condition, a second dynamo-electric machine responsive to variations in the magnitude of said electrical condition, and means operable in accordance with said second dynamo-electric machine for modifying the effect of the variation of said electrical condition to which said first mentioned dynamo-electric machine is responsive.

4. In an electrical regulating system, in combination, an electric circuit, means connected to said circuit, said means being operable in response to variations in an electrical condition of said circuit to produce compensatory changes in said electrical condition, and additional means connected to said additional circuit, said means including electromagnetic means which develops a force proportional to the magnitude of said electrical condition, means responsive to movements of said electromagnetic means for increasing the effect of the variation in said electrical condition to which said first mentioned electrical condition responsive means is responsive, and a counter force producing means for developing a force sufficient to prevent the operation of said additional means when said electrical condition is normal.

5. In an electrical regulating system, in combination, an electric circuit, a dynamo-electric machine connected thereto, regulating means for varying the excitation of said machine in response to variations in an electrical condition of said circuit so as to maintain said condition substantially constant, a second dynamo-electric machine connected to said circuit so that its torque is proportional to the magnitude of said electrical condition, means operable in accordance with movements of said dynamo-electric machine for increasing the apparent magnitude of the variation in said electrical condition to which said regulating means is responsive, and means for producing a torque which opposes the operation of said second dynamo-electric machine.

6. In an electrical regulating system, in combination, an electric circuit, a polyphase synchronous dynamo-electric machine connected thereto, regulating means operative in accordance with variations in an electrical condition of said circuit for varying the excitation of said machine, a polyphase torque motor connected to said circuit so that its torque varies in accordance with variations in said electrical condition, means responsive to movements of said motor for increasing the apparent effect of the variations in said electrical condition to which said regulating means is responsive, and magnetic counter torque producing means associated with said motor whereby the resultant torque tending to operate said motor is substantially zero when said electrical condition is normal.

7. In combination, an alternating current circuit, means for regulating an electrical condition of said circuit, said means including operating means connected to said circuit and operative in accordance with variations in said electrical condition, a torque motor connected to said circuit so that its torque varies in accordance with variations of said electrical condition, a variable ratio transformer operatively associated with said motor, the primary winding thereof being connected across said circuit, the secondary winding thereof being connected in series with said first mentioned operating means, and means for opposing the torque of said motor.

8. In combination, an alternating current circuit, means electrically connected to said circuit for regulating an electrical condition thereof, said means including an operating means connected to be responsive to variations in said electrical condition, a transformer, the primary winding thereof being connected across said circuit, the secondary winding thereof being connected in series with said operating means, means for moving said windings relatively to each other, said means including a torque motor connected to said circuit, and magnetic means for opposing the torque of said motor.

9. In an electrical regulator, movable means for producing a force which varies in accordance with an electrical condition to be regulated, movable regulating means mechanically connected with said first mentioned means, said movable regulating means producing a force which aids the force produced by said first mentioned means but which varies with the movement of said movable means, and means mechanically connected to said first mentioned movable means for producing a force which opposes the forces of said movable means and said movable regulating means and which varies with the movement of said first mentioned means in the same way that the force produced by said movable regulating means varies.

10. In an electrical regulator, rotatable means for producing a regulating voltage which varies with the angular position of said means, said means producing a torque which varies with its angular position, operating means connected to said voltage producing means, said operating means producing a torque which varies directly with variations in the magnitude of an electrical condition to be regulated, and rotatable counter torque producing means, said means having an extended range of angular positions in which its torque is equal and opposite the sum of the torque of said voltage producing means and the torque of said operating means, when said electrical condition is of normal value.

11. In an electrical regulator, movable means for producing a force which varies in accordance with an electrical condition to be regulated, movable regulating means mechanically connected with said first mentioned means, said movable regulating means producing a force which aids the force produced by said first mentioned means but which varies with the movement of said movable means, means mechanically connected to said first mentioned movable means for producing a force which opposes the two first mentioned forces and which varies with the movement of said first mentioned means in the same way that the force produced by said movable regulating means varies, and damping means for opposing the motion of all of said above mentioned means.

12. In an electrical regulator, rotatable means for producing a regulating voltage which varies with the angular position of said means, said means producing a torque which varies with its angular position, operating means connected to said voltage producing means, said operating means producing a torque which varies directly with variations in the magnitude of an electrical condition to be regulated, rotatable counter torque producing means, said means having an extended range of angular positions in which its torque is equal and opposite to the sum of the torque of said voltage producing means and the torque of said operating means, when said electrical condition is of normal value, and electro-magnetic means for opposing the rotation of all of said above mentioned means.

13. In an electrical regulator, a transformer, means for moving one of the windings of said transformer relatively to another winding thereof, said means comprising a dynamo-electric machine connected to be responsive to the magnitude of an electrical condition to be regulated, a magnetic armature member fastened to the shaft of said motor and a permanent magnet associated with said armature.

14. In an electrical regulating system, in combination, a dynamo-electric machine, a field winding therefor, means for energizing said field winding, a regulator for varying the current through said field winding in response to variations in an electrical condition of said machine, said regulator including a normally deenergized anti-hunting coil which is responsive to the magnitude and direction of the rate of change of field current in said dynamo-electric machine for opposing the action of said regulator.

15. In an electrical regulating system, in combination, a dynamo-electric machine, a field winding therefor, means for energizing said field winding, a regulator for varying the current through said field winding in such a manner as to tend to maintain an electrical condition of said dynamo-electric machine constant, a current transformer having its primary winding connected in the circuit with said field winding, and an anti-hunting coil connected to the secondary winding of said transformer in such a way that the effect of the energization of said anti-hunting coil is to oppose any action of said regulator.

16. In an electrical regulating system, in combination, a dynamo-electric machine, a regulator associated therewith for varying the excitation of said machine in accordance with variations in an electrical condition thereof in such a manner as to tend to maintain said condition constant, magnetic means producing an effect which balances the regulator when said electrical condition is of normal magnitude, and electromagnetic means associated with said magnetic means for varying the effect of said magnetic means, so as to oppose the action of said regulator, in proportion to the magnitude of the rate of charge of current in said field winding.

17. In a voltage regulating system, in combination, a polyphase circuit, a polyphase alternator connected thereto, a voltage regulator including a polyphase torque motor connected to be responsive to the voltage of said circuit for regulating the field excitation of said alternator, means including a second polyphase torque motor connected to be responsive to the voltage of said circuit, and means mechanically connected to said second motor for inserting a voltage in the circuit of said first torque motor which varies, as a result of movement of said second motor, in proportion to variations in the voltage of said circuit.

18. In a voltage regulating system, in combination, a polyphase circuit, a polyphase alternator connected thereto, means for energizing the field winding of said alternator, a variable resistance connected so as to be able to vary the field current of said alternator, a polyphase torque motor connected across said circuit, means mechanically connecting said variable resistance with said motor, constant-torque variable-position means connected to oppose the torque of said motor, a second polyphase torque motor connected across said circuit, means connected to be operated by said second motor to insert a variable voltage in the circuit of said first motor, magnetic restraining means associated with said second torque motor and electromagnetic anti-hunting means responsive to the rate of change of field current of said alternator associated with said magnetic restraining means.

In witness whereof, I have hereunto set my hand this 5th day of April, 1930.

LEONARD R. BIGGS.